US006525782B2

(12) United States Patent
Cheng

(10) Patent No.: US 6,525,782 B2
(45) Date of Patent: Feb. 25, 2003

(54) ADAPTING CONNECTOR FOR A VIDEO MACHINE

(76) Inventor: Yu-Feng Cheng, No. 7, Fuhsing St., Tucheng Ind. Dist., Tucheng City, Taipei Hsien (TW)

(*) Notice: Subject to any disclaimer, the term of this patent is extended or adjusted under 35 U.S.C. 154(b) by 18 days.

(21) Appl. No.: 09/841,790

(22) Filed: Apr. 24, 2001

(65) Prior Publication Data

US 2002/0167774 A1 Nov. 14, 2002

(51) Int. Cl.$^{7}$ .................................................. H04N 9/77
(52) U.S. Cl. ....................................... 348/663; 348/554
(58) Field of Search ................................ 348/663, 668, 348/667, 738, 554, 552, 584; 439/620

(56) References Cited

U.S. PATENT DOCUMENTS 4,937,672 A * 6/1990 Anderson .................. 348/554
5,367,342 A * 11/1994 Bang .......................... 348/666
6,201,580 B1 * 3/2002 Voltz et al. ................. 348/552

* cited by examiner

*Primary Examiner*—Shawn Riley
(74) *Attorney, Agent, or Firm*—Kolisch Hartwell, P.C.

(57) ABSTRACT

An adapting connector for a video machine has an S terminal, a VIDEO terminal, and two filter units connected to the S terminal and the VIDEO terminal. The filter units of the adapting connector eliminate noise from the transmitting signal between the S terminal and the VIDEO terminal to output a high quality image.

20 Claims, 6 Drawing Sheets

ADAPTING CONNECTOR FOR A VIDEO MACHINE

BACKGROUND OF THE INVENTION

1. Field of the Invention

The present invention relates to an adapting connector for a video machine, and more particularly to an adapting connector for a video machine that is able to convert the signal from a video machine with an S terminal to an older television with a VIDEO terminal.

2. Description of Related Art

Recently, the video machine products have changed very fast as a result of dynamic research and the great popularity of the products. Multimedia products can provide high quality reproduction of image and audio, and the price of the products is not expensive.

The current digital video machine is compatible with VCD/DVD input to read the VCD/DVD digital data. In general, the image output terminal of the machine uses an S terminal for transmitting the image signal. However, an image input terminal of an older television is a VIDEO terminal, therefore, the new multimedia machine can not connect the different specification terminals of the television with the video terminal.

As per the above description, the television can not connect to the new video machine with an S terminal, but the older television still works and thus the owner has a dilemma—abandon the older TV set, which is wasteful, or be denied the enjoyment of the latest media. Thus, people usually have to buy a new television with an S terminal to enjoy the high quality image shown on a screen of the television.

With reference to FIG. 6, a main portion transmitting image signal of a convention connector for a video machine includes an S terminal (50) and a VIDEO terminal (60) connected to the S terminal (50). The S terminal (50) includes four ports, wherein two ports thereof, a C signal port and a Y signal port, transmit image signal from a video machine. The C signal port transmits a mixed signal having a synchronization signal and a single image signal, and the Y signal port transmits a color image signal. The C signal port connects through a capacitor (70) to the Y signal port. When the mixed signal and the color image signal transmit to the VIDEO terminal (60), the capacitor (70) is able to filter DC signal in the synchronization of the mixed signal. Therefore, the capacitor (70) ensures the transmitting signal to keep synchronous.

The above invention is able to provide that the image signal of the S terminal transmits to the VIDEO terminal (60) of a TV. However the capacitor (70) is able to filter the DC signal in the synchronization signal, but the color image signal still interferes the synchronization signal. Thus, the unclear image transmitted through the connector is shown on the TV screen.

To overcome the shortcomings, the present invention tends to provide an improved adapting connector for a video machine to mitigate and obviate the aforementioned problems.

SUMMARY OF THE INVENTION

The objective of the present invention is able to provide an adapting connector for a video machine that is able to connect between a digital video machine with an S terminal and a video machine with a VIDEO terminal.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
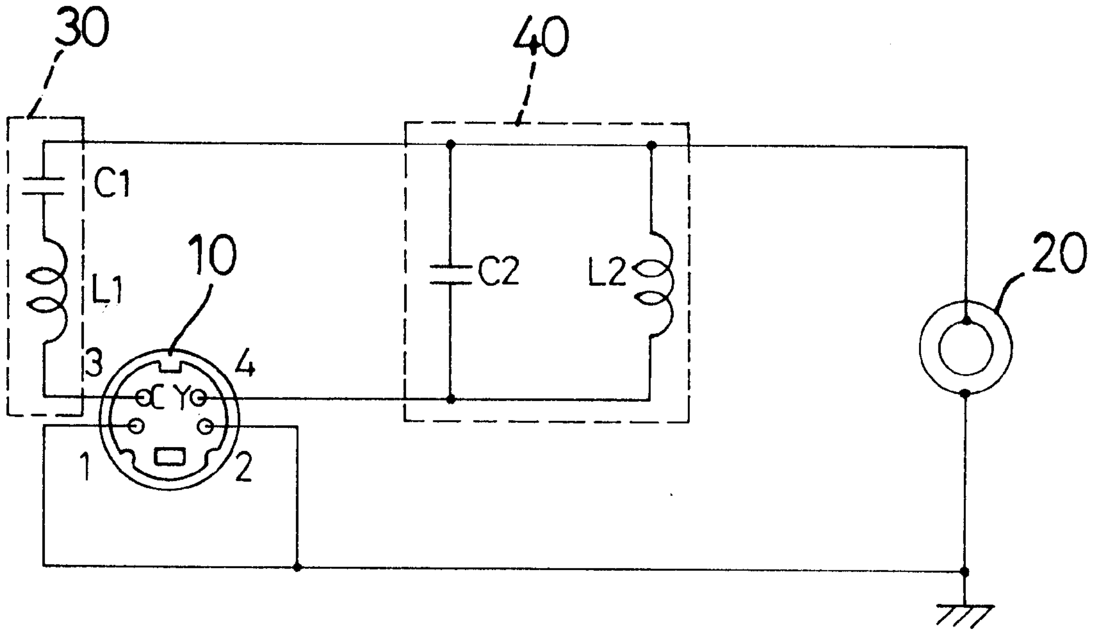
FIG. 1 is a circuit diagram for an adapting connector for a video machine in accordance with the present invention.

With reference to FIG. 1, an adapting connector for a video machine includes an S terminal (10), a VIDEO terminal (20), and two filter units (30)(40) electrically connecting the S terminal (10) with the VIDEO terminal (20).

The S terminal (10) has four ports, a Port 1 and a Port 2 are connected with ground, a Port 3 is a C signal port, and a Port 4 is a Y signal port. The C signal port transmits a mixed signal having a synchronization signal and a single image signal, and the Y signal port transmits a color image signal.

The first filter unit (30), which connects the C signal port with the VIDEO terminal (20), composes a first capacitor C1 with a first inductor L1 connected with the first capacitor C1 in series. Thus the C signal port connects with the first capacitor C1 through the first inductance L1.

The second filter unit (40), which connects the Y signal port with the VIDEO terminal (20), composes a second capacitor C2 with a second inductor L2 connected with the second capacitor C2 in parallel.

When the C signal port transmits the mixed image signal through the first filter unit (30), the output signal of the first filter unit (30) completely eliminates a DC signal of the mixed image signal, therefore the DC signal is able to avoid interfering in the synchronization image signal. In the first embodiment of the video converter, the capacitance value of the first capacitor C1 is 5.6 uH, and the inductance value of the first inductor L1 is 390 pF. In accordance with the formula, $$f = \frac{1}{2\pi\sqrt{LC}}$$

a filter frequency value of the first filter unit (30) is 3.58 MHz.

The Y signal port transmits a color image signal through the second filter unit (40), whereby the output signal of the second filter unit (40) is able to ensure the output color image signal of the Y signal does not have noise interference. A capacity value of the second capacitor C2 and the inductance value of the second inductor L2 are the same as the capacitance value of the capacitor C1 and the inductance value of the inductor L1, thus a filter frequency of the second filter unit (40) is also 3.58 MHz.

Figure 2:
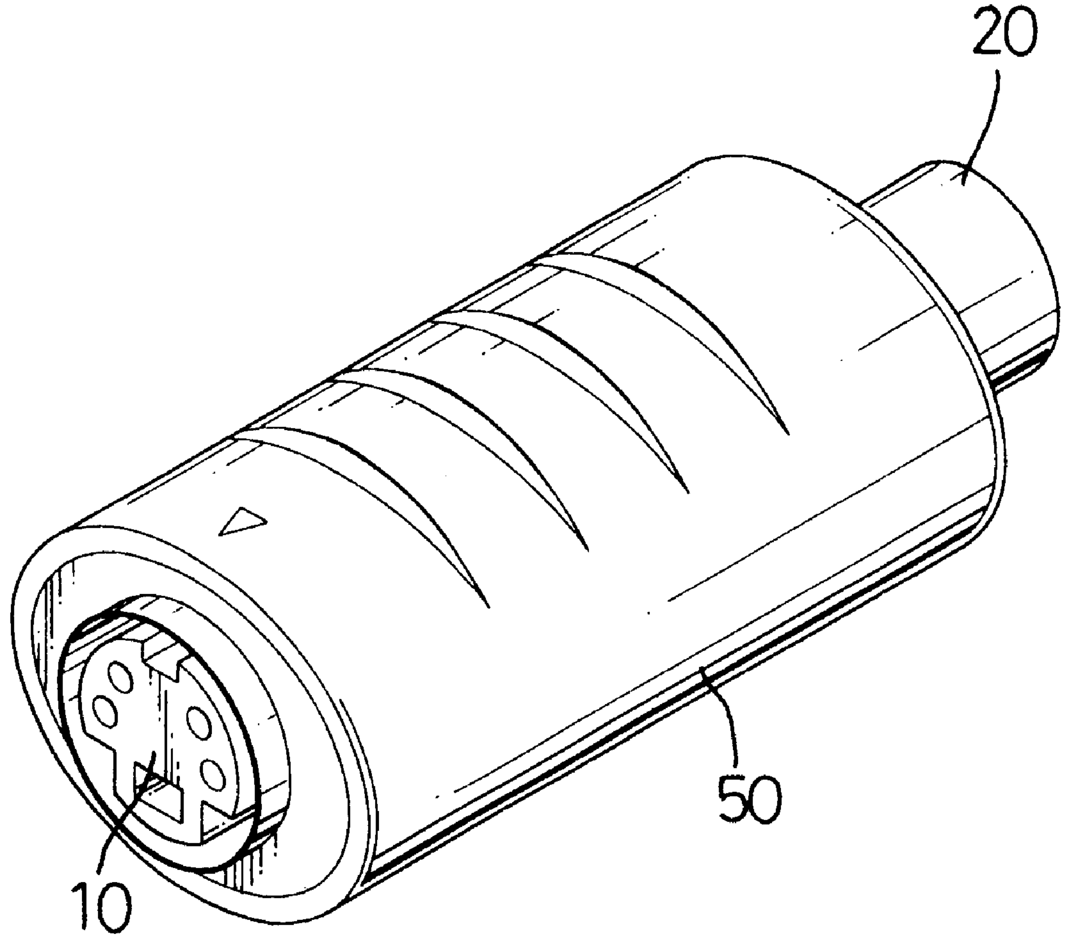
FIG. 2 is a perspective view of a first embodiment of an adapting connector for a video machine in accordance with the present invention.
Figure 3:
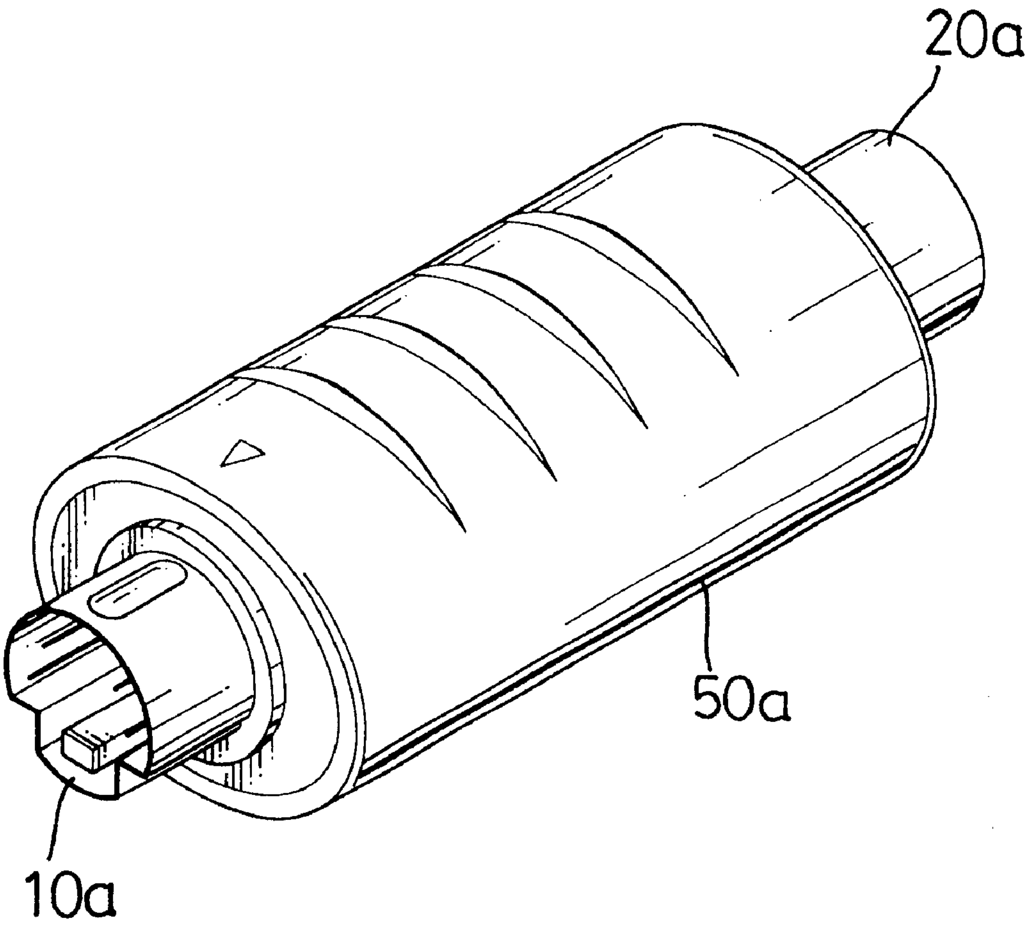
FIG. 3 is a perspective view of a second embodiment of an adapting connector for a video machine in accordance with the present invention.
Figure 4:
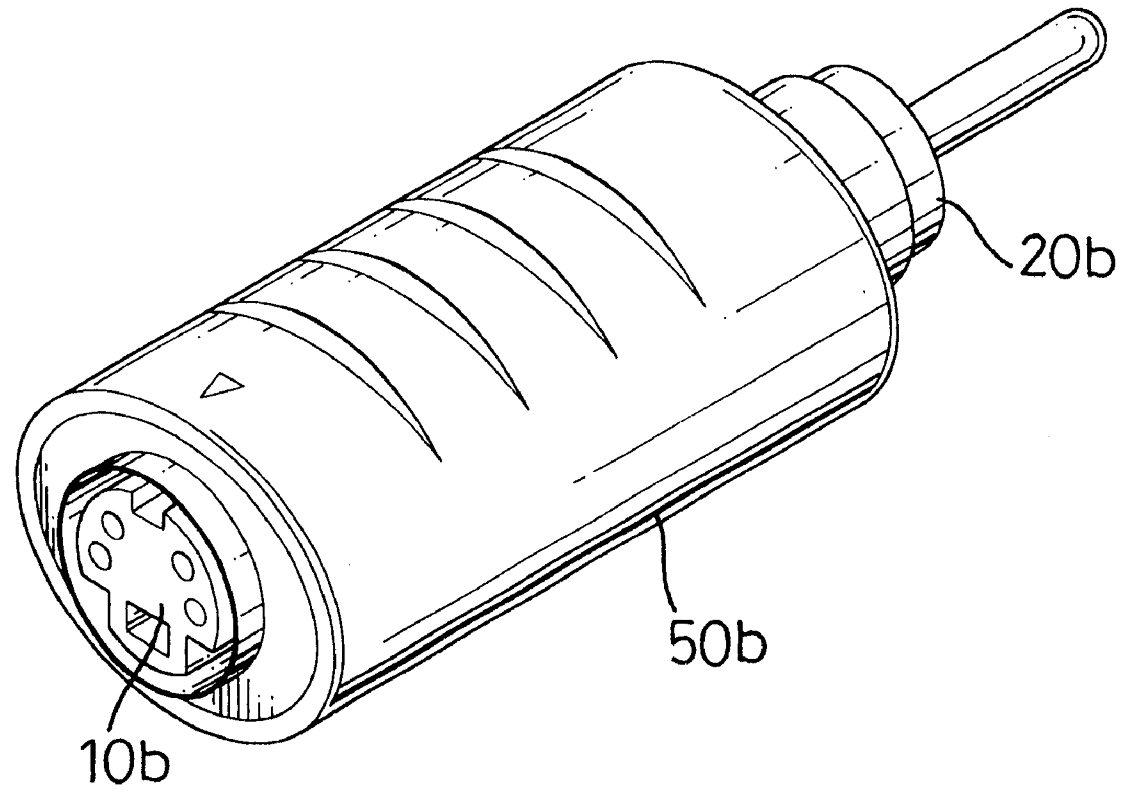
FIG. 4 is a perspective view of a third embodiment of an adapting connector for a video machine in accordance with the present invention.

With reference to FIG. 2, a body (50) of the connector has two opposite ends. The S terminal (10) is formed on one end of the body (50) and the VIDEO terminal (20) is formed on the other end of the body (50), wherein the S terminal (10) is a female terminal to mate with a video machine having a male S terminal (not shown). A second embodiment of the adapting connector for a video machine is shown in FIG. 3, wherein the S terminal (10*a*) is formed as a male terminal, and the VIDEO terminal (20*a*) is a female terminal. A third embodiment of the adapting connector for a video machine is shown FIG. 4, wherein the VIDEO terminal (20*b*) is a male terminal, and the S terminal (10*b*) is a female terminal.

Figure 5:
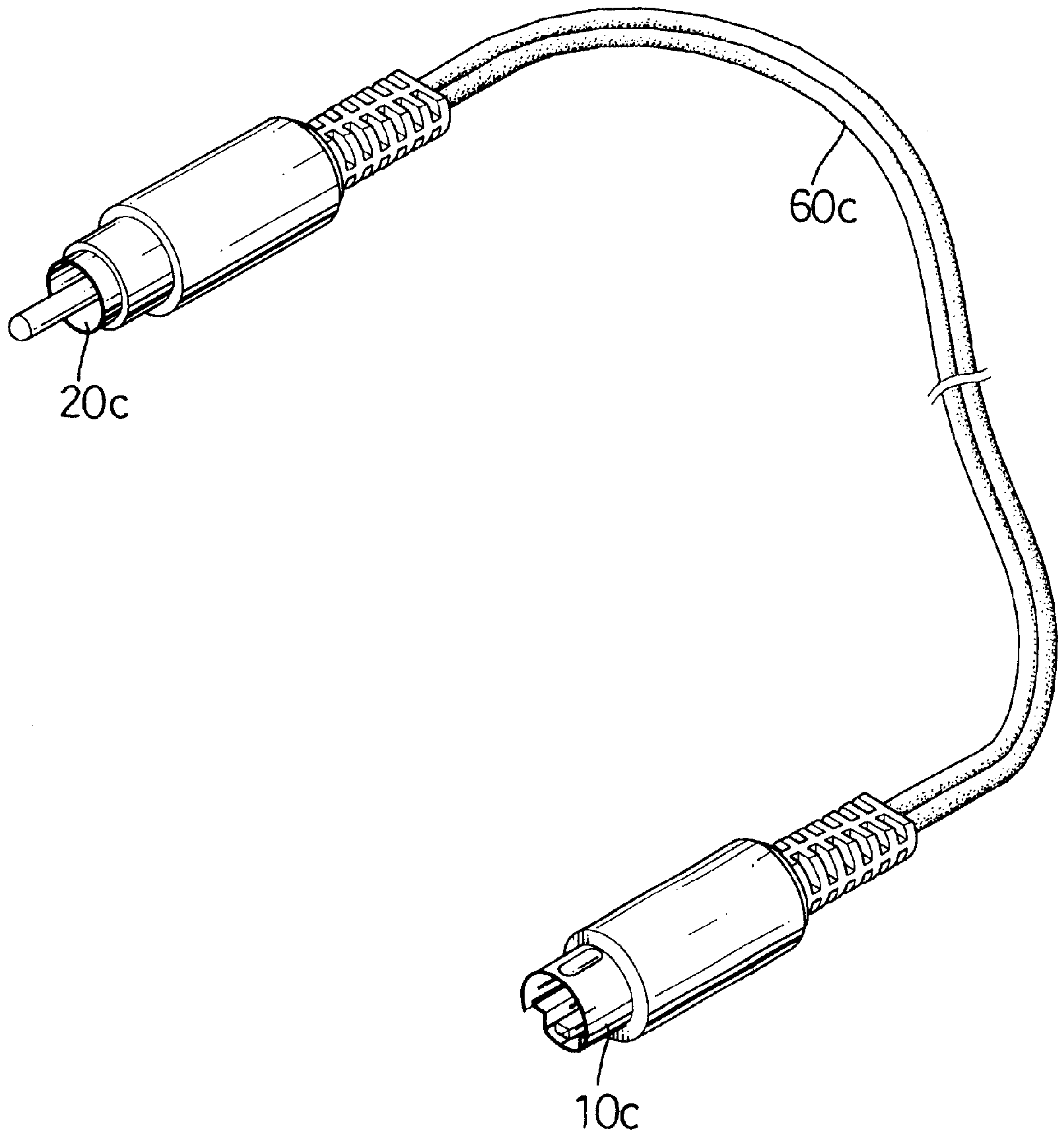
FIG. 5 is a perspective view of a fourth embodiment of an adapting connector for a video machine in accordance with the present invention.
Figure 6:
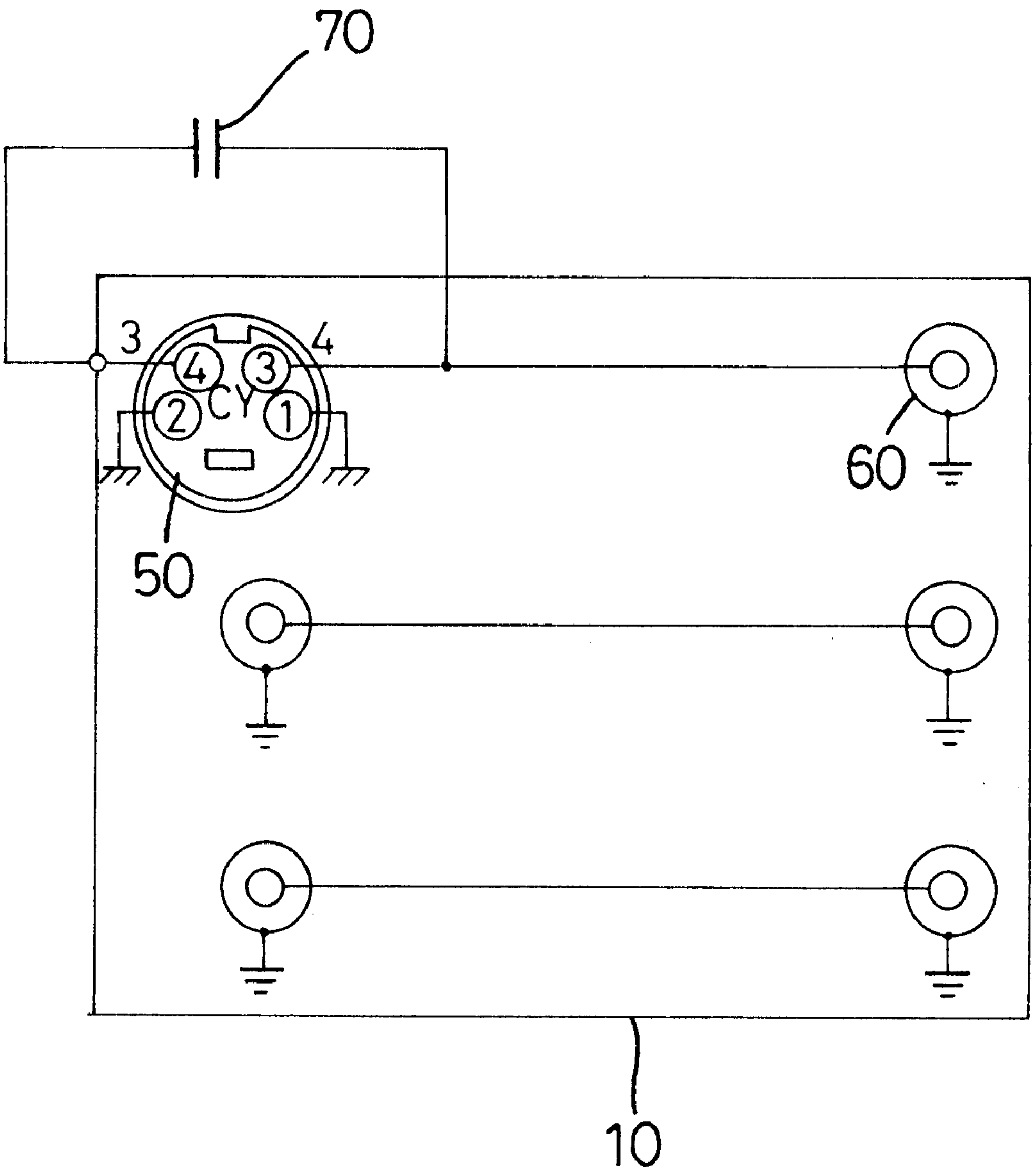
FIG.6 PRIOR ART
FIG. 6 is a circuit diagram for a convention connector for digital video machine.

With reference to FIG. 5, a fourth embodiment of the adapting connector for a video machine is shown, wherein a cable (60) connects the S terminal (10*c*) with the VIDEO terminal (20*c*). The first filter unit (not shown) and the second filter unit (not shown) can be formed in the S terminal (10*c*) or in the VIDEO terminal (20*c*).

In addition to all of the above, the adapting connector for a video machine is able to connect a video machine having an S terminal with the video machine having a VIDEO terminal. In other words, the older video machine, such as one combined with a TV, easily obtains the image signal from the video machine with an S terminal via the video signal converter device. Besides, the filter units can eliminate the noise with the transmitting signal between the S terminal and the VIDEO terminal. Thus, people not only can save a lot of money by using existing machines instead of replacing them, they also obtain the best quality of the image signal.

Although the present invention has been explained in relation to its preferred embodiment, it is to be understood that many other possible modifications and variations can be made without departing from the spirit and scope of the invention as hereinafter claimed.

What is claimed is:

1. An adapting connector for a video machine comprising:

an S terminal having four ports, wherein one of the four ports is a C signal port transmitting a mixed signal having a synchronization signal and a single signal, and one of the four ports is a Y signal port transmitting a color image signal;

a VIDEO terminal connected with the S terminal to receive the mixed signal and the color signal from the S terminal;

a first filter unit connecting the C signal port to the VIDEO terminal for eliminating noise of signal transmitting between the C signal port and the VIDEO terminal; and a second filter unit connecting the Y signal port the VIDEO terminal for eliminating noise of signal transmitting between the Y signal port and the VIDEO terminal.

2. The adapting connector for a video machine as claimed in claim 1, wherein the first filter unit composes of a first capacitor and a first inductor connected to the first capacitor in series, wherein the C signal port is connected to the first capacitor through the first inductor.

3. The adapting connector for a video machine as claimed in claim 1, wherein the second filter unit composes of a second capacitor and a second inductor connected to the second capacitor in parallel.

4. The adapting connector for a video machine as claimed in claim 1, wherein the S terminal and the VIDEO terminal are respectively formed on two ends of a body of the connector, wherein the S terminal connects to the VIDEO terminal through the first filter unit formed in the body and the second filter unit formed in the body.

5. The adapting connector for a video machine as claimed in claim 1, wherein the S terminal externally connects to the VIDEO terminal.

6. The adapting connector for a video machine as claimed in claim 2, wherein the S terminal externally connects to the VIDEO terminal.

7. The adapting connector for a video machine as claimed in claim 3, wherein the S terminal externally connects to the VIDEO terminal.

8. The adapting connector for a video machine as claimed in claim 4, wherein the S terminal is a male or female terminal, and the VIDEO terminal is a male or female terminal.

9. The adapting connector for a video machine as claimed in claim 5, wherein the S terminal is a male terminal, and the VIDEO terminal is a male terminal.

10. The adapting connector for a video machine as claimed in claim 5, wherein the S terminal is a male terminal, and the VIDEO terminal is a female terminal.

11. The adapting connector for a video machine as claimed in claim 5, wherein the S terminal is a female terminal, and the VIDEO terminal is a male terminal.

12. The adapting connector for a video machine as claimed in claim 5, wherein the S terminal is a female terminal, and the VIDEO terminal is a female terminal.

13. The adapting connector for a video machine as claimed in claim 6, wherein the S terminal is a male terminal, and the VIDEO terminal is a male terminal.

14. The adapting connector for a video machine as claimed in claim 6, wherein the S terminal is a male terminal, and the VIDEO terminal is a female terminal.

15. The adapting connector for a video machine as claimed in claim 6, wherein the S terminal is a female terminal, and the VIDEO terminal is a male terminal.

16. The adapting connector for a video machine as claimed in claim 6, wherein the S terminal is a female terminal, and the VIDEO terminal is a female terminal.

17. The adapting connector for a video machine as claimed in claim 7, wherein the S terminal is a male terminal, and the VIDEO terminal is a male terminal.

18. The adapting connector for a video machine as claimed in claim 7, wherein the S terminal is a male terminal, and the VIDEO terminal is a female terminal.

19. The adapting connector for a video machine as claimed in claim 7, wherein the S terminal is a female terminal, and the VIDEO terminal is a male terminal.

20. The adapting connector for a video machine as claimed in claim 7, wherein the S terminal is a female terminal, and the VIDEO terminal is a female terminal.

* * * * *